United States Patent [19]

Barnum et al.

[11] Patent Number: 5,242,979
[45] Date of Patent: Sep. 7, 1993

[54] ORGANOSILICON COMPOSITIONS CONTAINING HYDROCARBON ELASTOMERS

[75] Inventors: Paquita E. Barnum; Richard L. Brady, both of New Castle County, Del.

[73] Assignee: Hercules Incorporated, Wilmington, Del.

[21] Appl. No.: 593,161

[22] Filed: Oct. 5, 1990

[51] Int. Cl.$^5$ .............................................. C08L 83/05
[52] U.S. Cl. ................................. 525/106; 525/479; 528/15; 528/25; 528/31
[58] Field of Search ................. 525/106, 479; 528/15, 528/25, 31

[56] References Cited

U.S. PATENT DOCUMENTS

| | | | |
|---|---|---|---|
| 4,657,981 | 4/1987 | Klosiewicz | 525/211 |
| 4,855,378 | 8/1989 | Pradl et al. | 528/26 |
| 4,900,779 | 2/1990 | Leibfried | 524/862 |
| 4,902,731 | 2/1990 | Leibfried | 523/222 |
| 5,008,360 | 4/1991 | Bard et al. | 528/25 |
| 5,013,809 | 5/1991 | Leibfried | 524/862 |
| 5,025,048 | 6/1991 | Burnier | 524/102 |
| 5,068,303 | 11/1991 | Bard et al. | 528/25 |

FOREIGN PATENT DOCUMENTS 2595364 9/1987 France .

Primary Examiner—Melvyn I. Marquis
Assistant Examiner—D. Aylward
Attorney, Agent, or Firm—Mark D. Kuller, Robert P. O'Flynn

[57] ABSTRACT

This invention is directed to a polymeric composition comprising (a) a continuous phase of a cross-linked organosilicon polymer comprised of alternating (i) polycyclic hydrocarbon residues derived from polycyclic polyenes having at least two non-aromatic, non-conjugated carbon-carbon double bonds in their rings and (ii) residues derived from the group consisting of cyclic polysiloxanes and tetrahedral siloxysilanes, linked through carbon to silicon bonds, and (b) a discontinuous phase of a low molecular weight hydrocarbon elastomer having at least two hydrosilation reactable carbon-carbon double bonds. In addition, this invention is directed to a prepolymer composition comprising (a) a hydrosilation cross-linkable organosilicon prepolymer which is the partial reaction product of (i) polycyclic polyenes having at least two non-aromatic, non-conjugated hydrosilation reactive carbon-carbon double bonds in their rings and (ii) cyclic polysiloxanes or tetrahedral siloxsilanes having at least two hydrosilation reactive ≡SiH groups wherein at least one of (i) or (ii) has at least three reactive groups, and (b) hydrocarbon elastomer having at least two hydrosilation reactable carbon-carbon double bonds.

20 Claims, 1 Drawing Sheet

ORGANOSILICON COMPOSITIONS CONTAINING HYDROCARBON ELASTOMERS

This invention is directed to cross-linked organosilicon polymers and cross-linkable organosilicon prepolymers comprised of polycyclic hydrocarbon residues and cyclic polysiloxane or siloxysilane residues linked through carbon to silicon bonds, further comprising hydrocarbon elastomer.

BACKGROUND OF THE INVENTION

Leibfried, in U.S. Pat. Nos. 4,900,779 and 4,902,731 and U.S. patent application Nos. 07/419,429 (filed Oct. 10, 1989) (now U.S. Pat. No. 5,013,809) and 07/419,430 (filed Oct. 10, 1989) (now U.S. Pat. No. 5,077,134) and Bard and Burnier, in U.S. patent application No. 07/422,214 (filed Oct. 16, 1989), (now U.S. Pat. No. 5,008,360) describe cross-linked organosilicon polymers and cross-linkable organosilicon prepolymers comprised of polycyclic hydrocarbon residues and cyclic polysiloxanes or siloxysilane residues linked through carbon to silicon bonds, and processes useful for preparing the same. These polymers have high glass transition temperatures ($T_g$), low dielectric constant, low moisture absorption and other desirable properties. The polymers and prepolymers are described as useful for electronic applications, such as preparing printed circuit boards (including substantially tack-free prepreg and laminates useful for preparing such circuit boards) and encapsulants, and structural materials.

One major weakness of these polymers is their brittleness. Brittleness can result in cracking or poor adhesive strength (e.g., poor adhesion of copper foil to circuit board laminate).

The inventors have discovered that certain elastomers improve the copper peel strength of and toughen the polymers and prepolymers, without significantly impacting other properties, such as Tg.

SUMMARY OF THE INVENTION

Accordingly, this invention is directed to a polymeric composition comprising (a) a continuous phase of a cross-linked organosilicon polymer comprised of alternating (i) polycyclic hydrocarbon residues derived from polycyclic polyenes having at least two non-aromatic, non-conjugated carbon-carbon double bonds in their rings and (ii) residues derived from the group consisting of cyclic polysiloxanes and tetrahedral siloxysilanes, linked through carbon to silicon bonds, and (b) a discontinuous phase of a low molecular weight hydrocarbon elastomer having at least two hydrosilation reactable carbon-carbon double bonds.

In addition, this invention is directed to a prepolymer composition comprising (a) a hydrosilation cross-linkable organosilicon prepolymer which is the partial reaction product of (i) polycyclic polyenes having at least two non-aromatic, non-conjugated hydrosilation reactive carbon-carbon double bonds in their rings and (ii) cyclic polysiloxanes or tetrahedral siloxsilanes having at least two hydrosilation reactive ≡SiH groups wherein at least one of (i) or (ii) has at least three reactive groups, and (b) hydrocarbon elastomer having at least two hydrosilation reactable carbon-carbon double bonds.

DETAILED DESCRIPTION OF THE DRAWINGS

Figure 1:
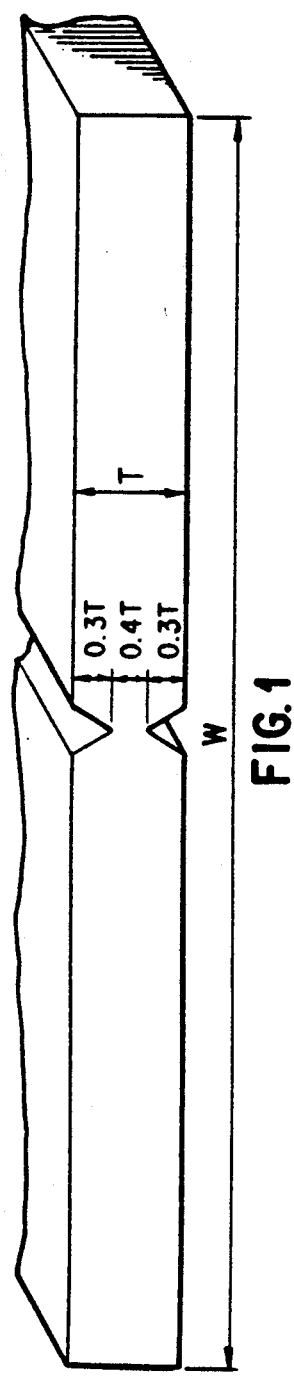
FIG. 1 depicts an end view of a test sample used in the double torsion test.

In FIG. 1, an end view of the test sample used in the double torsion test is depicted. "T" describes the thickness of the test sample, and "W" describes the width of the test sample. "03 T" defines a thickness of 30% of T and "0.4 T" defines a thickness of 40% of T.

Figure 2:
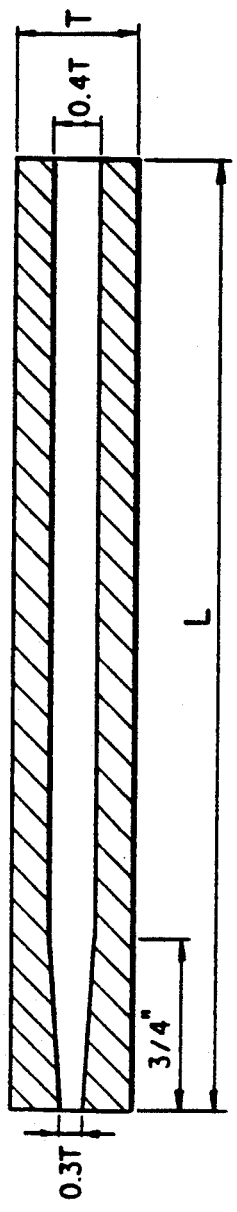
FIG. 2 depicts a side view of the sample. The end to the left of the figure is the precrack end.

In FIG. 2, a side view of the sample is depicted where, as in FIG. 1., "T" as in is the thickness of the sample, "0.3 T" defines a thickness of 30% of T and "0.4 T" defines a thickness of 40% of T. "L" is the length of the sample and "l" describes the length of the sample which is beveled to a maximum depth of 35% of the total thickness of he sample.

Figure 3:
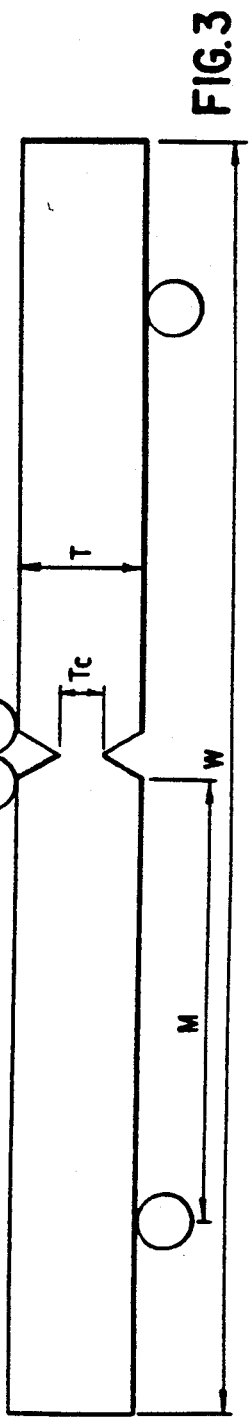
FIG. 3 is a depiction of the testing of the sample in double torsion.

In FIG. 3, the testing of the sample is depicted in double torsion. As in FIGS. 1 and 2, "T" is the total thickness of the sample, and "W" is the total width of the sample. "Load" is the load applied to the sample during the test. "Tc" is the reduced thickness of the sample, and "M" is the length of a moment arm used in the test.

DETAILED DESCRIPTION OF THE INVENTION

Herein, "SiH" is be used to describe hydrosilation reactable ≡SiH groups.

Any cyclic polysiloxane or tetrahedral siloxysilane with two or more hydrogen atoms bound to silicon can be used to form the cross-linked organosilicon polymer or hydrosilation cross-linkable organosilicon prepolymer. Cyclic polysiloxanes useful in forming the products of this invention have the general formula:

(I)

wherein R is hydrogen, a saturated, substituted or unsubstituted alkyl or alkoxy radical, a substituted or unsubstituted aromatic or aryloxy radical, n is an integer from 3 to about 20, and R is hydrogen on at least two of the silicon atoms in the molecule.

Examples of reactants of Formula (I) include, e.g., tetra- and penta-methylcyclotetrasiloxanes; tetra-, penta-, hexa- and hepta-methylcyclopentasiloxanes; tetra-, penta- and hexa-methylcyclohexasiloxanes, tetraethyl cyclotetrasiloxanes and tetraphenyl cyclotetrasiloxanes. Preferred are 1,3,5,7-tetramethylcyclotetrasiloxane, 1,3,5,7,9-pentamethylcyclopentasiloxane and 1,3,5,7,9,11-hexamethylcyclohexasiloxane, or blends thereof.

The tetrahedral siloxysilanes are represented by the general structural formula:

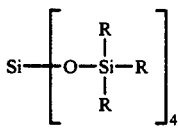

wherein R is as defined above and is hydrogen on at least two of the silicon atoms in the molecule.

Examples of reactants of Formula (II) include, e.g., tetrakisdimethylsiloxysilane, tetrakisdiphenylsiloxysilane, and tetrakisdiethylsiloxysilane. The tetrakisdimethylsiloxysilane is the best known and preferred species in this group.

The polymers and prepolymers of this invention may also contain other hydrosilation reactable polysiloxanes bearing two or more SiH groups. For instance, they may contain linear, short chain SiH terminated polysiloxanes having the general formula:

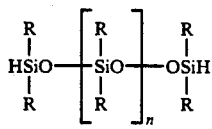

wherein n is 0 to 1000 and R is alkyl or aryl, preferably methyl or phenyl, as described by Leibfried in U.S. patent application Nos. 07/419,429 and 07/419,430, (now U.S. Pat. Nos. 5,013,809 and 5,077,134, respectively) supra. These linear, short chain SiH terminated polysiloxanes impart flexibility to the cured polymers and can be used to produce elastomers.

Polycyclic polyenes useful in preparing the composition of this invention are polycyclic hydrocarbon compounds having at least two non-aromatic, carbon-carbon double bonds. Illustrative are compounds selected from the group consisting of cyclopentadiene oligomers (e.g., dicyclopentadiene ("DCPD"), tricyclopentadiene (also known as "cyclopentadiene trimer") and tetracyclopentadiene), norbornadiene dimer, bicycloheptadiene (i.e., norbornadiene) and its Diels-Alder oligomers with cyclopentadiene (e.g., dimethanohexahydronaphthalene), and substituted derivatives of any of these, e.g., methyl dicyclopentadienes. Preferred are cyclopentadiene oligomers, such as dicyclopentadiene and tricylopentadiene. Two or more polycyclic polyenes can be used in combination.

Other hydrocarbon compounds may also be used. For instance, according to one embodiment described in U.S. patent application No. 07/422,214, now U.S. Pat. No. 5,008,360 supra, the hydrocarbon component comprises (a) at least one low molecular weight (typically having a molecular weight less than 1,000, preferably less than 500) polyene having at least two non-aromatic carbon-carbon double bonds highly reactive in hydrosilation (they may contain other less reactive (including unreactive) double-bonds, provided that those double bonds do not interfere with the reactivity of the highly reactive double bonds; but, compounds having only two highly reactive double bonds are preferred), the carbon-carbon double bonds being either in an alpha, beta or gamma position on a linear carbon moiety, next to two bridgehead positions in a strained polycyclic aliphatic ring structure, or in a cyclobutene ring, and (b) at least one polycyclic polyene having at least two chemically distinguishable non-aromatic, non-conjugated carbon-carbon double bonds in its rings.

Examples of component (a) include 5-vinyl-2-norbornene, o-, m- or p-diisopropenylbenzene, o-, m- or p-divinylbenzene, diallyl ether, diallyl benzene, dimethanohexahydronaphthalene and the symmetrical isomer of tricyclopentadiene. In component (b), by "having at least two chemically distinguishable carbon-carbon double bonds" it is meant that at least two carbon-carbon double bonds have widely different rates of reaction in hydrosilation and that one of the double bonds will react prior to substantial reaction of the other double bond(s). This first double bond must be quite reactive in hydrosilation. Reactive double bonds include those that are next to two bridgehead positions in a strained polycyclic aliphatic ring structure or in a cyclobutene ring, as per component (a) of the embodiment described directly above. The other carbon-carbon double bond(s) may be any other non-aromatic, 1,2-disubstituted non-conjugated carbon-carbon double bond that is not next to two bridgehead positions in a strained polycyclic aliphatic ring structure and is not in a cyclobutene ring. Exemplary are dicyclopentadiene and the asymmetrical isomer of tricyclopentadiene. Preferred, for electronic applications, are polymers made from dicyclopentadiene, tricyclopentadiene and methylhydrocyclosiloxane.

The reactions for forming the organosilicon prepolymers and polymers of this invention are described in U.S. patent application Nos. 07/419,429, 07/419,430, and 07/422,214, (now U.S. Pat. Nos. 5,013,809, 5,077,134 and 5,008,360, respectively) and U.S. Pat. No. 4,900,779 and 4,902,731, supra. The reactions for forming the prepolymer and for forming a polymer from the prepolymer can be promoted thermally or by the addition of a hydrosilation catalyst or radical generators such as peroxides and azo compounds. Hydrosilation catalysts include metal salts and complexes of Group VIII elements. The preferred hydrosilation catalysts contain platinum (e.g., PtCl$_2$, dibenzonitrile platinum dichloride, platinum on carbon, etc.). The preferred catalyst, in terms of both reactivity and cost, is chloroplatinic acid (H$_2$PtCl$_6$.6H$_2$O). PC072 and PC075 (Huls America, Bristol Pa.) are preferred for curing prepolymers. Catalyst concentrations of 0.0005 to about 0.05% by weight of platinum, based on the weight of the monomers, are preferred.

Several approaches are available to prepare the polymers. It is possible, by selection of reactants, reactant concentrations and reaction conditions, to prepare polymers exhibiting a broad range of properties and physical forms. Thus, it has been found possible to prepare tacky solids, elastomeric materials, and tough glassy polymers.

In one approach, the correct relative ratios of reactants and the platinum catalyst are simply mixed and brought to a temperature at which the reaction is initiated and proper temperature conditions are thereafter maintained to drive the reaction to substantial completion (typically, with a ratio of carbon-carbon double bonds to SiH groups of about 1:1, when 70 to 90% of the SiH groups are consumed).

Generally, with cyclic polysiloxanes or tetrahedral siloxysilanes, thermoset polymers result when the ratio of carbon-carbon double bonds of (b) to SiH groups in (a) is in the range of from about 0.5:1 up to about 1.3:1, more preferably from about 0.8:1 up to about 1.1:1. The alternating residues form a cross-linked thermoset structure.

The prepolymers can be prepared as disclosed in U.S. patent application No. 07/422,214, (now U.S. Pat. No. 5,008,360) and U.S. Pat. Nos. 4,900,779 and 4,902,731, supra. Generally, the initial product of the reaction at lower temperatures, e.g., about 25° to about 80° C., is a cross-linkable prepolymer, which may be in the form of a solid or a flowable, heat-curable liquid, even though the ratio of carbon-carbon double bonds to SiH groups is otherwise suitable for cross-linking. The prepolymers generally have 30 to 70% of the SiH groups reacted, and when liquids are desired preferably about 30 to 60% of the SiH groups reacted. Such prepolymers can be recovered and subsequently transferred to a mold for curing.

These prepolymers are prepared using polycyclic polyenes having at least two chemically distinguishable non-aromatic, non-conjugated carbon-carbon double bonds in their rings. Illustrative are compounds selected from the group consisting of dicyclopentadiene, asymmetrical tricyclopentadiene, and methyl dicyclopentadiene, and substituted derivatives of any of these. Preferred is dicyclopentadiene. Such prepolymers can also be prepared with the hydrocarbon combinations described in U.S. patent application No. 07/422,214, (now U.S. Pat. No. 5,008,360) supra.

The prepolymers, including the viscous, flowable liquid prepolymers, are stable at room temperature for varying periods of time, and cure upon reheating to an appropriate temperature, e.g., about 100° to about 250° C. Often, additional catalyst is added to the prepolymer prior to cure to further promote the reaction.

A second type of prepolymer can be prepared by a process described in U.S. Pat. No. 4,900,779 and U.S. patent application Nos. 07/419,429 and 07/419,430 (now U.S. Pat. Nos. 5,013,809 and 5,077,134 respectively). In this process, an olefin rich prepolymer is prepared by reacting a large excess of polycyclic polymers with cyclic siloxanes or tetrahedral siloxysilanes. The olefin rich organosilicon prepolymer is blended with additional cyclic polysiloxane or tetrahedral siloxysilane before cure.

According to this process, organosilicon prepolymers are made with a large excess of carbon-carbon double bonds available for reaction with SiH groups. That is, the ratio of carbon-carbon double bonds in the rings of the polycyclic polyenes used to form the polycyclic polyene residues (a) to SiH groups in the cyclic polysiloxanes and tetrahedral siloxysilanes used to form the cyclic polysiloxane or tetrahedral siloxysilanes residues (b) is greater than 1.8:1, preferably greater than 1.8:1 and up to 2.2.:1.

The prepolymers of this embodiment are generally in the form of flowable liquids, which are stable at room temperature. The most stable prepolymers are formed at a double bond to SiH ratio of about 2:1 since virtually all polyene is reacted and excess polycyclic polyene need not be removed. (Due to their odor, the presence of unreacted polycyclic polyenes is undesirable. When necessary or desirable, unreacted polycyclic polyenes can be stripped, e.g., using a rotoevaporator, to form odorless compositions.)

Later, cross-linked polymers are formed by mixing the prepolymers with the polysiloxanes/siloxysilanes such that the total ratio of non-aromatic, non-conjugated carbon-carbon double bonds in the rings of the polycyclic polyenes used to form the polycyclic polyene residues (a) to SiH groups in the polysiloxanes and siloxysilanes used to form the polysiloxane/siloxysilane residues (b) is in the ratio of 0.4:1 to 1.7:1; preferably 0.8:1 to 1.3:1, most preferably about 1:1, and curing the mixture in the presence of a hydrosilation catalyst.

Preferably, according to this embodiment, the organosilicon prepolymers are reacted with the polysiloxanes and/or siloxysilanes to form a cross-linked polymer in a mold. The prepolymers and polysiloxanes/siloxysilanes are stored separately and are blended before entering the mold. The hydrosilation catalyst may be present in either or both stream(s) or injected directly into the mixer. The reaction is exothermic and proceeds rapidly so that the polymer gels and the product can be removed from the mold in minutes. The components of the blends are completely stable until they are mixed. This permits indefinite ambient storage of the materials.

Alternately, the blend components can be premixed and stirred in a tank. These blends have low viscosity and are pumpable. Addition of catalyst and/or application of heat can be used to cure the prepolymer composition. The reaction may be carried out in an extruder, mold or oven, or the blend may be applied directly on a substrate or part.

With all of the above processes, the reaction speed and its accompanying viscosity increase can be controlled by use of a cure rate retardant (complexing agent), such as N,N,N',N'-tetramethylethylenediamine, diethylenetriamine or phosphorus compounds.

A number of options exist for incorporating additives into the prepolymers or polymers of this invention.

A number of options exist for incorporating additives into the prepolymers or polymers of this invention. Additives such as fillers and pigments are readily incorporated. Carbon black, vermiculite, mica, wollastonite, calcium carbonate, silica, fused silica, fumed silica, glass spheres, glass beads, ground glass and waste glass are examples of fillers which can be incorporated. Fillers can serve either as reinforcement or as fillers and extenders to reduce the cost of the molded product. Glass spheres are useful for preparing low density composites. When used, fillers can be present in amounts up to about 85%.

Fiber reinforced composites may be made with the prepolymers of this invention. They can contain as much as 80%, preferably 30 to 60%, by weight, of fibrous reinforcement. Fibrous reinforcement useful in this invention includes glass, etc., as described in U.S. Pat. Nos. 4,900,779 and 4,902,731.

The polymers of this invention have excellent electrical insulating properties and resistance to moisture. Often, they have high glass transition temperatures.

The polymers and prepolymers of this invention are well-suited for electronic applications, e.g., composites, adhesives, encapsulants, potting compounds and coatings. They are especially useful for preparing laminates, such as those used for printed circuit boards.

Stabilizers (antioxidants) are useful to maintain storage stability of B stage materials and thermal oxidative stability of the final product. Preferred are bis(1,2,2,6,6-pentamethyl-4-piperidinyl)-(3,5-di-tert-butyl-4-hydroxybenzyl)butylpropanedioate, (available as Tinuvin ™ 144 from Ciba-Geigy Corp., Hawthorne, NY) or a combination of octadecyl 3,5-di-tert-butyl-4-hydroxyhydrocinnamate (also known as octadecyl 3-(3',5'-di-tert-butyl-4'-hydroxyphenyl)propionate) (available as Naugard ® 76 from Uniroyal Chemical Co., Middlebury, CT) and bis(1,2,2,6,6-pentamethyl-4-piperidinylsebacate) (available as Tinuvin 765® from Ciba-Geigy Corp.).

Use of the elastomers of this invention improves the peel strength of the cured polymer when it is adhered to copper, and the toughness of the cured polymer, without significantly affecting other properties. That is, there is not a significant effect on the dielectric constant, glass transition temperature or thermal coefficient of expansion. These properties make the resins useful in the preparation of composites, coating, adhesives, circuit board laminates, molded circuit boards, encapsulants and potting resins.

In order for an elastomer to be effective in toughening the glassy polymer without significantly affecting other properties, there are several requirements. First, there is a reaction between the prepolymer and elastomer in order for there to be adhesion between phases of the polymer. Second, the polymer and elastomer should form two phases.

In order to obtain the desired product, the elastomer should have two or more hydrosilation reactable carbon-carbon double bonds. Elastomers having large numbers of double bonds tend to react with the prepolymer to form a one phase system. The hydrocarbon rubber may be hydrogenated to reduce the number of carbon-carbon double bonds, so that phase separation does occur. Preferably, the elastomer should have no more than 50 mole % >C═C<, preferably no more than 25 mole % >C═C< and most preferably no more than 15 mole % >C═C<.

The elastomer is preferably present as micron-sized particles forming a secondary phase. The particles are in the range of 0.001 to 50 micron in diameter, preferably 0.01 to 10 micron in diameter, and most preferably 0.1 to 5 micron in diameter.

Suitable results have been obtained with elastomers that are soluble or insoluble in liquid prepolymer. However, dispersability in liquid prepolymer is desirable for storage stability, since it is preferable that the mixture does not separate during storage.

The preferred hydrocarbon elastomers have a molecular weight of less than 100,000. Preferred are low molecular weight ethylene-propylene-diene terpolymers (also known as "EPDM" or "EPDM rubber") (available as Trilene 65 and Trilene 67 from Uniroyal Chemical Co., Middlebury, CT), partially hydrogenated low molecular weight polyisoprene (90% hydrogenated available as L1R 290 from Nissho Iwai American Corp, New York, NY), partially hydrogenated low molecular weight styrene-butadiene or butadiene polymers (polymers, such as Ricon 184 or 131, Colorado Chemical Specialties, Inc. Grand Junction, CO which must be hydrogenated by the purchaser) and low molecular weight butyl rubber (copolymer of isobutylene and isoprene, available as Kalene 800 from Hardman Inc., Belleville, NJ). More preferred are low molecular weight EPDM rubbers, with Trilene 65 being the most preferred of these.

Elastomer is generally used in an amount of 0.5 to 20%, preferably 3 to 12%, and most preferably 5 to 10%, by weight.

Elastomer may be added to the prepolymer or during prepolymer synthesis.

The following examples, wherein all parts, percentages, etc., are by weight, illustrate the invention.

Catalyst A

A 1500 ppm chloroplatinic acid/dicyclopentadiene (CPA/DCPD) catalyst was prepared by sparging with nitrogen for five minutes in a glass container 0.15 parts CPA, and then adding 100 parts DCPD and stirring at 50° to 70° C. for 1 hour. Afterwards the complex was allowed to cool to room temperature. This catalyst will be referred to as catalyst A.

Catalyst B

Catalyst B was a commercially available catalyst, PC072, from Huls America, Bristol, PA.

Catalyst C

A 200 ppm chloroplatinic acid/dicyclopentadiene catalyst was prepared in the same manner as used to prepared catalyst A using 0.02 parts CPA and 100 parts DCPD.

Catalyst D

Catalyst D was a commercially available catalyst, PC075, from Huls America, Bristol, PA.

Catalyst E

A 3000 ppm chloroplatinic acid/dicyclopentadiene catalyst was prepared in the same manner as catalyst A using 0.30 parts CPA and 100 parts DCPD.

EXAMPLE 1 (Control)

This example demonstrates preparation of prepolymer without rubber.

Into a glass container were added 1.7 parts Tinuvin® 144 as an antioxidant, 42.1 parts toluene, 82.9 parts of a 29% w/w mixture of cyclopentadiene trimer in dicyclopentadiene ("DCPD"), 1.4 DCPD, and 78.3 parts methylhydrocyclosiloxane (a mixture of predominantly 8, 10, and 12 membered siloxane rings) ("MHCS"). The glass container was sealed and a nitrogen bleed attached.

Then, 4.19 parts catalyst A (CPA/DCPD complex) were added. Stirring was carried out at ambient temperature to 30° C. until 99% of the more reactive double bonds (half of the double bonds of the polycyclic polyenes) were hydrosilylated.

The gel time of the resultant prepolymer solution was measured by placing 2 to 3 drops of the solution directly onto a Fischer-Johns melting point apparatus at 156° C. and stirring with a wooden applicator stick until it gelled. It was found to be greater than 12 minutes. At this time, 0.06 parts catalyst B were added. The gel time was found to be 2 minutes.

The prepolymer solution was transferred to a second glass container, and the container was placed under aspirator vacuum followed by high vacuum to remove 99% of the toluene solvent. The gel time of the resulting prepolymer was tested again. It was found to be 1.75 minutes at 157° C.

The prepolymer was then poured into a 80° C. Teflon lined stainless steel mold, and placed into a 80° C. oven for cure with a nitrogen purge. The cure cycle was heating from 80° C. to 168° C. over a one hour period, holding between 168° C. to 175° C. for one hour, heating from 175° C. to 255° C. over 1 hour, holding at 255° C. for 4 hours, and cooling slowly in the oven to room temperature over 12 hours.

Samples were cut from the cured plaque with a diamond saw and tested for: (1) Tg and thermal expansion coefficient by thermal mechanical analyzer (TMA), (2) flex modulus and strength according to ASTM D790, (3) phase morphology by transmission electron microscopy (TEM), and (4) $G_{1c}$ fracture toughness by ASTM E 399-83 (1983) (modified as described in S. A. Thompson et al, SAMPE Journal Vol. 24, No. 1, pp. 47-49 (1988)) in Examples 1 to 8 and 20 and by a double torsion test (See, for example, A. J. Kinloch and R. J. Young, Fracture Behavior of Polymers, Applied Science Publishers, New York, 1983.) in Examples 9-19.

The double torsion tests were carried out as follows: First, the plaques were cut into 1.5 inch by 4.5 inch by 0.125 inch samples. On both sides of the rectangles, a 45 degree groove was cut down the center lengthwise with a 45 degree diamond wheel. The groove was beveled at a depth of 30% of the samples thickness, except than it was beveled to a maximum depth of 35% of the total thickness starting 0.75 inches from one end of the rectangle. The resulting sample is illustrated in FIG. 1.

Referring now to FIG. 2, the groove was such that one end had a reduced thickness section.

The sample was then precracked at the end bevelled to a depth of 35% of the thickness, by tapping a razor blade into the end. The beveled groove prevents the precrack from propagating the length of the sample before testing. The sample was then tested in double torsion as illustrated in FIG. 3.

Typically there was stop/start propagation of the crack so that several peak loads, Pc, could be measured for each sample. The mode I fracture toughness, $G_{1c}$, was calculated according to:

$$G_{1c} = 3\ Pc^2 M / 2 Tc T^3 WG$$

where
Pc=peak load
M=moment arm=12.7 mm
Tc=reduced thickness=1/20 inch
T=total thickness=⅛ inch
G=shear modulus, taken=0.9 GPa for all samples
W=specimen width=1.5 inch
All dimensions were measured by a digital micrometer. The results for Example 1 are shown in Table 1.

EXAMPLE 2 (INVENTION)

This example demonstrates preparation of prepolymer with rubber.

Into a glass container were added 1.2 parts Tinuvin ® 144 as an antioxidant, 21.6 parts toluene, 12 parts of a 30% (W/W) solution of Trilene ® 65 low molecular weight EPDM rubber (Uniroyal Chemical Company, Middlebury, CT) in toluene, 57.3 parts of a 28.9% w/w mixture of cyclopentadiene trimer in DCPD, 55.11 parts MHCS, and 2.84 parts catalyst A (CPA/DCPD complex). The glass container was sealed (it had a pressure release device) and the container was placed in a 40° C. water bath. Stirring was carried out in a 40° C. water bath for six hours and then at ambient temperature until 99% of the more reactive double bonds (half of the double bonds of the polycyclic polyenes) were reacted.

The gel time of the resultant prepolymer solution was measured by placing 2 to 3 drops of the solution directly onto a Fischer-Johns melting point apparatus at 155° C. and stirring with a wooden applicator stick until it gelled. It was found to be greater than 11 minutes. At this time, 0.012 parts catalyst B were added. The gel time was found to be 2 minutes, 15 seconds.

The prepolymer solution was transferred to a second glass container, and the container was placed under aspirator vacuum followed by high vacuum to remove 99% of the toluene solvent. The gel time of the resulting prepolymer was tested again. It was found to be 2.5 minutes at 159° C.

The prepolymer was then poured into a 60° C. Teflon lined stainless steel mold, and placed into a 60° C. oven for cure with a nitrogen purge. The cure cycle was heating from 60° C. to 160° C. over a two hour period, holding between 160° and 170° C. for one hour, heating from 170° to 235° over 2 hours, holding at 235° C. for 4 hours, and cooling slowly in the oven to room temperature over 12 hours.

Samples were cut from the cured plaque and tested as described in Example 1.

The results for Example 2 are shown in Table 1. Addition of 3% low molecular weight EPDM rubber (Trilene 65) had no significant effect on the glass transition and of the polymer, but it caused a doubling of the fracture toughness value (as compared to Example 1).

EXAMPLE 3 (INVENTION)

This example demonstrates the effectiveness of increasing amounts of low molecular weight EPDM rubber at toughening.

Into a glass container were added 1.2 parts Tinuvin ® 144 as an antioxidant, 2 parts toluene, 52.9 parts of a 29% w/w mixture of cyclopentadiene trimer in DCPD, 40 parts of a 30% w/w solution of Trilene ™ 65 low molecular weight EPDM rubber in toluene, 51.1 parts MHSC, and 2.85 parts catalyst A (CPA/DCPD complex). The glass container was sealed and a nitrogen bleed attached. The container was placed in a 44° C. bath and stirring was carried out for six hours, followed by stirring at ambient temperature until 99% of the more reactive double bonds (half of the double bonds of the polycyclic polyenes) were reacted.

The gel time of the resultant prepolymer solution was measured by placing 2 to 3 drops of the solution directly onto a Fischer-Johns melting point apparatus at 157° C. and stirring with a wooden applicator stick until it gelled. It was found to be greater than 11 minutes. At this time, 0.013 parts catalyst B were added. The gel time was found to be 2.5 minutes at 158° C.

The prepolymer solution was transferred to a second glass container, and the container was placed under aspirator vacuum followed by high vacuum to remove 99% of the toluene solvent. The gel time of the resulting prepolymer was tested again. It was found to be .75 minutes at 157° C.

The prepolymer was then poured into a 60° C. Teflon lined stainless steel mold, and placed into a 60° C. oven for cure with a nitrogen purge. The cure cycle was heating from 60° C. to 160° C. over a two hour period, holding between 160° and 170° C. for one hour, heat from 170° to 235° over 2 hours, holding at 235° C. for 4 hours, and cooling slowly in the oven to room temperature over 12 hours.

Samples were cut from the cured plaque and tested as described in Example 1.

The results are shown in Table 1. Addition of 10% Trilene 65 to the base resin increased its fracture toughness to 114 $J/m^2$ with no effect on the glass transition temperature and only a small increase in the thermal coefficient of expansion.

EXAMPLE 4

This example shows preparation of a glass reinforced laminate containing no rubber.

A resin solution was prepared in a glass container by adding together 98.9 parts MHCS, 107.2 parts of a 28.8% solution of cyclopentadiene trimer in DCPD, 2.17 parts Tinuvin TM 144, 55 parts hexane, and 11 parts catalyst A. The container was placed in a large 25° C. water bath and the solution was stirred until all of the more reactive double bonds were reacted. The gel time of the resultant prepolymer solution was found to be 1 minute 20 seconds at 171° C.

The prepolymer solution was poured into a stainless steel container equipped with two bars above the container, as described in example 4. The glass fabric was pulled through the solution and bars, and hung to cure in an oven at 150° C. for approximately 150–175 seconds, after which it was removed and allowed to cool. The resultant prepreg was substantially tack free and contained about 45 weight percent prepolymer.

Two four layer copper topped laminates were prepared by stacking prepregs (prepared as described above) between Teflon sheets and aluminum caul plates, with a piece of copper on the top prepreg, and placing the stack in a room temperature press at 27.8 pounds per square inch. The press was heated to 165° C., held for 1 hour, and then cooled. The laminates were then post cured at 200° C. in a nitrogen sparged oven for 2 hours.

The copper peel strength of the laminate was measured using an Instron equipped with a bottom grip that allowed the copper to be pulled at 90.0 degrees from the laminate at all times. The units of data obtained from the Instron are pounds per linear inch. The results are shown in Table 1. The peel strength for this resin containing no rubber was 3.15 pounds per linear inch ("pli").

EXAMPLE 5 (INVENTION)

This example demonstrates that the copper peel strength increases when EPDM rubber is added.

A prepolymer was prepared using 49 parts MHCS, 36.7 parts DCPD, 17 parts cyclopentadiene trimer, 1.65 parts Naugard TM 76 as antioxidant, 0.34 parts Tinuvin TM 765 as antioxidant, 43.25 parts of a 23.5% (W/W) solution of low molecular weight EPDM rubber (Trilene TM 65) in toluene, and 5.4 parts catalyst A. The gel point of the prepolymer was 1 minute, 45 seconds at 170° C. Copper topped glass laminates of the resin were prepared as described in Example 4.

The results for Example 5 are shown in Table 1. The copper peel strength for Example 5 was 5.1 pli compared to 3.15 pli for Example 4, containing no EPDM rubber.

EXAMPLE 6 (CONTROL)

This example demonstrates preparation of a prepolymer without rubber, using 5-vinyl-2-norbornene.

Into a glass container were added 25.0 parts MHCS, 21.4 parts DCPD, 2.2 parts catalyst E (3000 ppm CPA/DCPD), 5.8 parts 5-vinyl-2-norbornene, and 0.55 parts Tinuvin 144. A mechanical stirrer and thermocouple were attached, and the container was placed in a 25° C. water bath. After eleven hours at temperatures between 25°–40° C., the gel point of the prepolymer was 6 minutes at 161° C.

The resin was poured into a Teflon-lined stainless steel mold, that had been treated with a release agent, and placed into a 100° C. oven for cure with a nitrogen purge according to the following schedule: heating at 100° C. for one hour, 165° C. for one hour and 220° C. for four hours, and cooling slowly in the oven over 12 hours. Samples were cut from the cured plaque and tested as described in Example 1. The results are shown in Table 1. The fracture toughness value for this resin was similar to the fracture toughness value obtained for the sample containing trimer of Example 1.

EXAMPLE 7 (CONTROL)

This example demonstrates preparation of prepolymer with a combination of 5-vinyl-2-norbornene and trimer, without rubber.

Into a glass container were added 2.90 parts of distilled 5-vinyl-2-norbornene (Aldrich), 12.39 parts of a 38.5 wt % solution of cyclopentadiene trimer in DCPD, 17.89 parts DCPD, 0.657 parts Tinuvan 144, 31.78 parts MHCS, and 16.42 parts toluene.

Then, 0.739 parts of a catalyst solution containing 2750 ppm Pt in DCPD was added. Stirring was carried out at room temperature to 56° C., and an additional 29.9 ppm Pt as Catalyst D was added to attain a gel time of 3 minutes, 20 seconds at 155° C.

Solvent was evaporated from the prepolymer solution as described in Example 1, and the prepolymer was poured into a 100° C. Teflon-lined stainless steel mold. The filled mold was placed in a 100° C. oven for cure with a nitrogen purge. The cure cycle was heating from 100° C. to 159° C. over 0.5 hour, holding between 159°–161° C. for one hour, heating to 250° C. over one hour, and holding at 250°–260° C. for 4.5 hours, and cooling slowly in the oven over 12 hours. Samples were cut from the cured plaque and tested as described in Example 1. The results are shown in Table 1. The fracture toughness value for this sample was similar to the fracture toughness value obtained for the sample of Example 1.

EXAMPLE 8 (INVENTION)

This example demonstrates preparation of prepolymer with a combination of 5-vinyl-2-norbornene and trimer, with rubber.

The mixture described in the previous example was prepared, but in place of the toluene, 23 parts of a solution of 6.57 parts Trilene 65 in 16.43 parts toluene were added to the mixture.

Then, 0.75 parts of a catalyst solution containing 2750 ppm platinum in DCPD were added. Stirring was carried out at ambient temperature to 56° C., and an additional 20 ppm Pt was added as Catalyst D to attain a gel time of 3 minutes and 20 seconds at 156° C. The solvent was evaporated from the prepolymer as described in Example 1, and the prepolymer was poured into a Teflon-lined stainless steel mold that was preheated to 115° C. The filled mold was placed in an oven heated to 110° C. and purged with nitrogen. The cure cycle was heating from 110° C. to 160° C. over 1 hour, holding at 155° to 160° C. for 1 hour, heating to 255° C. over 20 minutes, and holding at 255° C. for 4 hours. The sample cooled slowly in the oven over an 8 hour period. Samples were cut from the cured plaque and tested as described in Example 1. The results are shown in Table 1. The fracture toughness value for this sample increased 5.5 fold relative to Example 7, but the glass transition temperature for the polymer containing rubber dropped relative to the control containing no rubber.

EXAMPLE 9 (CONTROL)

This example describes preparing a prepolymer without rubber.

A prepolymer solution comprising 150.6 parts MHCS, 168.2 parts of a mixture of cyclopentadiene dimer and trimer (30% trimer in final polymer), 23.3 parts catalyst C, 15.8 parts Naugard TM 76/-Trinuvin TM 765/toluene at a 50/10.1/60.1 ratio, and 79.6 parts toluene was made by the method in Example 1.

The prepolymer solution was further activated with 80 ppm Pt (from a 9.05% wt solution of Catalyst B in toluene) to attain a gel time of 2 minutes 1 second at 160° C. (Gel times were measures using 4 drops of resin solution on a Fischer-Johns melting point apparatus.)

The prepolymer solution was placed in a rotary evaporator for 2.5 to 3 hours at 40° C. to strip greater than 99% of the toluene off. The prepolymer was then poured into a 100° C. preheated stainless steel mold and placed in a programmable oven for cure with a nitrogen purge. The cure cycle was heating from room temperature to 160° C. at 2° C./minute, holding at 160° C. for 1 hour, heating from 160° C. to 250° C. at 1° C./minute, holding at 250° C. for 4 hours, and cooling slowly in the oven to room temperature over 12 hours. The resulting plaque was transparent.

Samples were prepared and tested as in Example 1. The results are shown in Table 2. The polymer, with no rubber, had a toughness of 61 J/m².

optical microscopy) at room temperature. The cured plaque was opague (two phases).

The results are shown in Table 2. The addition of 5% low molecular weight EPDM rubber raised toughness to 86 J/m² without significantly affecting Tg or thermal coefficient of expansion. Modulus was reduced only slightly.

EXAMPLE 11 (INVENTION)

This example demonstrates the effectiveness of low molecular weight EPDM with ethylidene norbornene termonomer (Trilene TM 67).

To the prepolymer solution of Example 9 was added 75 ppm Pt as Catalyst B to give a gel time of 1 min, 55 sec at 160° C. To 95 parts of activated prepolymer in solution was added 5 parts Trilene TM 67 according to the procedure in Example 10. All other procedures were as in Example 9. The stripped prepolymer blend and the cured plaque were phase separated.

The results are shown in Table 2. The addition of 5% Trilene TM 67 raised the toughness to 85 J/m² without lowering Tg or raising TCE.

EXAMPLE 12 (COMPARISON)

This example shows that low molecular weight polyisoprene (available as Isolene 40 from Hardman, Inc., Belleville, N.J.) is not effective in toughening.

To the prepolymer of Example 9 was added 80 ppm Pt as Catalyst B to give a gel time of 1 min, 55 sec at 160° C. To 95 parts activated prepolymer in solution

TABLE 1

| Example | Rubber (Wt %)[1] | Cyclopentadiene Trimer (Wt %)[2] | 5-Vinyl-2-Norbornene (Wt %)[3] | $G_{Ic}$[4] (J/m²) | Peel Strength (pli)[5] | Tg (°C.)[6] | TCE[7] 30-245° C. (ppm) | Flex Modulus (1000 psi)[8] | Flex Strength (psi)[9] | Phases/ Domain Size (microns) |
|---|---|---|---|---|---|---|---|---|---|---|
| 1 | — | 14.2 | — | 22 | — | 162 | 118 | 288 | 8148 | 1/ |
| 2 | 3 | 13.8 | — | 55 | — | 151.5 | 139 | 281 | 9100 | 2/ 0.3-1 |
| 3 | 10 | 12.7 | — | 114 | — | 163 | 139 | 214 | 6897 | 2/ 0.5-1.8 |
| 4 | — | 14 | — | — | 3.15 | — | — | — | — | 1 |
| 5 | 8.9 | 14 | — | — | 5.2 5.1 | — | — | — | — | 2 |
| 6 | — | — | 10.34 | 37.2 | — | — | — | — | — | 1 |
| 7 | — | 7.2 | 4.4 | 26.2 | — | 174 | 127 | — | — | 1 |
| 8 | 9 | 6.54 | 4.0 | 144 | — | 136.2 | 162 | — | — | 2 |

[1]Weight percent Trilene TM 65 low molecular weight EPDM rubber.
[2]Weight percent cyclopentadiene trimer.
[3]Weight percent 5-vinyl-2-norbornene.
[4]Fracture toughness.
[5]Peel strength, pounds per linear inch.
[6]Glass transition temperature.
[7]Thermal coefficient of expansion over 30-246° C.
[8]Flexural modulus in thousands of pounds per square inch.
[9]Flexural strength in pounds per square inch.

EXAMPLE 10 (INVENTION)

This example demonstrates the procedure for adding rubber to prepolymer, and the effectiveness of low molecular weight EPDM.

The prepolymer solution as described in Example 9 was activated with 75 ppm Pt as Catalyst B to give a gel time of 1 min 55, seconds at 160° C. To 95 parts of prepolymer (prepolymer still in solution) was added 5 parts Trilene TM 65 low moleculer weight EPDM rubber. The solution was stirred for 15 hours at room temperature. The EPDM rubber dissolved to form a slightly cloudy solution. The prepolymer solution blend was then rotovaped, cured, and tested as in Example 9. The prepolymer blend after stripping was slightly cloudy (small scale phase separation as confirmed by was added 5 parts low molecular weight polyisoprene according to the procedure of Example 10. All other procedures were as in Example 9. The stripped prepolymer blend and resulting plaque were clear, indicating no phase separation had occurred.

The results are shown in Table 2. The addition of 5% Isolene 40 does not significantly increase toughness of the base resin. This is because the elastomer had too many carbon-carbon double bonds reactive in hydrosilation. The extreme reaction between this elastomer and the resin prevented phase separation. With other elastomers, higher levels of carbon-carbon bonds are tolerated.

EXAMPLE 13 (INVENTION)

This example demonstrates the effectiveness of partially hydrogenated low molecular weight polyisoprene. The purpose of using hydrogenated material is to reduce the number of carbon/carbon double bonds and limit reaction with the prepolymer on cure. This limited reaction promotes phase separation, which provides toughness without significantly affecting Tg or TCE.

To the prepolymer solution of Example 9 was added 75 ppm Pt as Catalyst B to give a gel time of 1 min, 59 sec at 160° C. To 95 parts of the activated prepolymer in solution was added 5 parts LIR290 90% hydrogenated low molecular weight polyisoprene (Nissho Iwai American Corp., New York, N.Y.) according to the procedure of Example 10. All other procedures were according to Example 9. Both solvent stripped prepolymer blend and cured plaque were phase separated.

The results are shown in Table 2. Adding 5% partially hydrogenated low molecular weight polyisoprene increased toughness to 78 J/m2 without significantly lowering Tg or raising TCE. Modulus was not significantly diminished.

EXAMPLE 14 (COMPARISON)

This example demonstrates the ineffectiveness at toughening the resin of low molecular weight ethylene-propylene copolymer (no diene).

To the prepolymer solution of Example 9 was added 78 ppm Pt as Catalyst B to give a gel time of 1 minute 52 seconds at 160° C. To 95 parts of the activated prepolymer in solution was added 5 parts Trilene CP80 low molecular weight ethylene-propylene copolymer (Uniroyal Chemical, Middlebury, Conn.) according to the procedure in Example 10. All other procedures were as in Example 9. The solvent-stripped prepolymer blend and cured plaque were phase separated.

The results are shown in Table 2. Addition of 5% low molecular weight ethylene-propylene copolymer improved Tg and TCE, but flex strength was reduced and toughness was not significantly improved. This is believed to be due to a lack of reaction between the phases due to the fact that the elastomer does not have two carbon-carbon double bonds.

EXAMPLE 15 (CONTROL)

A prepolymer solution was produced as follows. To a glass container was added 111.1 parts DCPD, 2.1 parts DCPD/CPA catalyst concentrate (0.275 weight % Pt in DCPD) and 55.9 parts toluene. This mixture was heated to 50° C. for 1 hour and then cooled to room temperature to form mixture B. Mixture A was prepared by combining 110.8 parts MHCS, 4.26 parts Naugard TM 76 and 0.85 parts Tinuvin TM 765 in a glass container. Mixture A was heated to 70° C., and mixture B was added dropwise with stirring to maintain a reaction temperature less than 100° C. The reaction solution was heated at 70° C. after addition was complete. The reaction considered completed when 99% of the norbornene carbon-carbon double bonds of the DCPD were reacted (as shown by NMR).

The prepolymer solution was activated with 10 ppm Pt as Catalyst B to give a gel time of 2 minutes 1 second at 160° C. The prepolymer was stripped, cured, and tested according to the procedures of Example 9. The stripped prepolymer and cured plaque were both clear. The results are shown in Table 2.

EXAMPLE 16 (INVENTION)

The prepolymer solution of Example 15 was activated with 10 ppm Pt as Catalyst B. To 95 parts of activated prepolymer in solution was added 5 parts Trilene TM 65 low molecular weight EPDM rubber according to the procedure of Example 10. All other procedures were according to Example 9. The stripped prepolymer blend and cured plaque were phase separated.

The results are shown in Table 2. Adding 5% low molecular weight EPDM rubber in a prepolymer increased the toughness to 89 J/m2 without significantly affecting Tg, TCE, or modulus.

EXAMPLE 17 (INVENTION)

This example shows the improved solubility and effectiveness in toughening of very low molecular weight EPDM.

To a prepolymer solution with the composition of Example 15 was added 10 ppm Pt as Catalyst B. To 95 parts of the activated prepolymer in solution was added 5 parts very low molecular weight EPDM (MW=3000) according to the procedure of Example 10. All other procedures were according to Example 9. The stripped prepolymer blend was not phase separated (optical microscopy) at room temperature, while the cured plaque was phase separated.

The results are shown in Table 2. The addition of 5% low molecular weight EPDM increased the toughness to 74 J/m$^2$ while not significantly affecting Tg, TCE, or modulus.

EXAMPLE 18 (INVENTION)

This example shows the effectiveness of low molecular weight butyl rubber.

To the prepolymer solution of Example 17 was added 10 ppm Pt as Catalyst B. 4.2 parts of Kalene TM 800 low molecular weight butyl rubber was dissolved in 20.1 parts toluene. This rubber solution was then mixed into the prepolymer solution at a prepolymer/rubber ratio of 95/5. The predissolving of the rubber was necessary because of its higher viscosity relative to the other rubbers. All other procedures were as in Examples 9 and 10. The stripped prepolymer blend and cured plaque were both phase separated.

The results are shown in Table 2. Addition of 5% low molecular weight butyl rubber increased toughness to 66 J/m$^2$ while retaining good Tg, TCE, and modulus.

EXAMPLE 19 (INVENTION)

This example shows the effectiveness of partially hydrogenated low molecular weight styrene-butadiene rubber ("SBR") in toughening the resin.

20 Parts Ricon TM 184 low molecular weight SBR (Colorado Chemical Specialties, Inc., Grand Junction, Colo.) was dissolved in 80 parts cyclohexane and hydrogenated in a reactor with a Palladium/carbon catalyst at 100° C. with a hydrogen pressure of 300 psi for 3–4 hours. The resulting solution was filtered to remove catalyst. NMR Results indicated 87% aliphatic carbon/carbon double bond hydrogenation. The filtered solution was added to the prepolymer solution of Example 17, which had been activated with 10 ppm Pt as Catalyst B. The prepolymer/rubber ratio was 95/5. All other procedures were according to Examples 9 and 10. The cured plaque was phase separated.

The results are shown in Table 2. Adding 5% hydrogenated low molecular weight SBR increased strength to 9500 psi and strain to break to 5.2% while retaining good Tg, TCE, and modulus. The toughness was 64 J/m².

EXAMPLE 20 (INVENTION)

This example shows the effectiveness of partially hydrogenated low molecular weight butadiene rubber.

Ricon ™ 131 low molecular weight butadiene rubber (Colorado Chemical Specialties, Inc., Grand Junction, Colo.) was hydrogenated and filtered as in Example 19. The rubber solution was then dried fully in a vacuum oven at 60° C. for greater than 2 hours. NMR results showed 92% hydrogenation of the double bonds.

To the prepolymer solution of Example 17 was added 10 ppm Pt as Catalyst B. To 95 parts of the activated prepolymer in solution was added 5 parts hydrogenated Ricon 131 according to the procedure of Example 10. All other procedures were as in Example 9. The cured plaque was phase separated.

The results are shown in Table 2. Addition of 5% hydrogenated Ricon 131 increased strength to 9700 psi and strain to 5.6% while not significantly altering Tg, TCE, or modulus. The toughness was 65 J/m².

TABLE 2

| Example | Solubility in Prepolymer | Phase After Cure/ TEM Domain Size (um)[1] | Tg (°C.)[2] | TCE[3] | Flex Modulus (1000 psi) | Flex Strength (psi) | Flex Strain (%) | Toughness Glc (J/m²) |
|---|---|---|---|---|---|---|---|---|
| 9 | — | 1/— | 158.9 | 125 | 321 | 9200 | 3.34 | 61 |
| 10 | Insoluble | 2/0.3–0.9 | 158.7 | 128 | 296 | 9400 | 4.3 | 86 |
| 11 | Insoluble | 2/0.4–0.9 | 166.9 | 123 | — | — | — | 85 |
| 12 | Soluble | 1/— | 156.7 | 130 | — | — | — | 65 |
| 13 | Insoluble | 2/0.3–1.0 | 170.6 | 116 | 291 | 9800 | 4.7 | 78 |
| 14 | Insoluble | 2/0.3–1.0 | 177.7 | 108 | 263 | 7400 | 3.3 | 64 |
| 15 | — | 1/— | 146.3 | 137 | 302 | 8900 | 3.9 | 53.6 |
| 16 | Insoluble | 2/— | 150.1 | 133 | 272 | 8500 | 4.2 | 89 |
| 17 | Soluble | 2/0.5–1.0 | 139.5 | 130 | 284 | 8580 | 3.8 | 74 |
| 18 | — | 2/0.7–1.5 | 160.3 | 124 | 258 | 8200 | 4.0 | 66 |
| 19 | — | 2/0.2–0.7 | 151.4 | 131 | 273 | 9500 | 5.2 | 64 |
| 20 | — | 2/0.5–1.0 | 148.4 | 138 | 279 | 9700 | 5.6 | 65 |

[1]Number of phases after cure/Domain Size (micrometers) measured by Transmission Electron Microscopy.
[2]Glass transition temperature.
[3]Thermal coefficient of expansion over 30 to 246° C. (ppm/°C.).

While the invention has been described with respect to specific embodiments, it should be understood that they are not intended to be limiting and that many variations and modifications are possible without departing from the scope and spirit of this invention.

What is claimed is:

1. A composition comprising (a) continuous phase of a cross-linked organosilicon polymer comprised of alternating (i) polycyclic hydrocarbon residues derived from polycyclic polyenes having at least two non-aromatic, non-conjugated carbon-carbon double bonds in their rings and (ii) residues derived from the group consisting of cyclic polysiloxanes and tetrahedral siloxysilanes, linked through carbon to silicon bonds and (b) a discontinuous phase of a low molecular weight hydrocarbon elastomer having at least two hydrosilation reactable carbon-carbon double bonds.

2. A composition as claimed in claim 1 which contains 0.5 to 20 weight % of the elastomer.

3. A composition as claimed in claim 1 which contains 3 to 12 weight % of the elastomer.

4. A composition as claimed in claim 1 which contains 5 to 10 weight % of the elastomer.

5. A composition as claimed in claim 1 wherein the residues (a) (ii) are derived from the cyclic polysiloxane.

6. A composition as claimed in claim 1 wherein the residues (a) (ii) are derived from the tetrahedral siloxysilanes.

7. A composition as claimed in claim 1 wherein the polycyclic hydrocarbon residues are derived from polycyclic hydrocarbon compounds selected from the group consisting of cyclopentadiene oligomers, norbornadiene, norbornadiene dimer, bicycloheptadiene and its Diels-Alder oligomers with cyclopentadiene, and substituted derivatives of any of these.

8. A composition as claimed in claim 4 wherein the polycyclic hydrocarbon residues are derived from polycyclic hydrocarbon compounds selected from the group consisting of dicyclopentadiene, methyl dicyclopentadiene and tricylopentadiene.

9. A composition as claimed in claim 1 wherein the elastomer is present as particles of 0.001 to 100 micron diameter.

10. A composition as claimed in claim 1 wherein the elastomer is present as particles of 0.1 to 5 micron diameter.

11. A composition as claimed in claim 1 wherein the elastomer is selected from the group consisting of ethylene-propylene-diene terpolymers, partially hydrogenated low molecular weight polyisoprene, partially hydrogenated butadiene polymers, partially hydrogenated styrene-butadiene polymers, and butyl rubber having a molecular weight less than 100,000.

12. A composition as claimed in claim 11 wherein the elastomer is selected from the group consisting of ethylene-propylene-diene terpolymers.

13. A composition as claimed in claim 1 wherein the elastomer contains no more than 50 mole % hydrosilation reactable carbon-carbon double bonds.

14. A composition as claimed in claim 1 wherein the elastomer contains no more than 25 mole % hydrosilation reactable carbon-carbon double bonds.

15. A composition as claimed in claim 1 wherein the elastomer contains no more than 15 mole % hydrosilation reactable carbon-carbon double bonds.

16. A prepolymer composition comprising (a) a hydrosilation cross-linkable organosilicon prepolymer composition which is the partial reaction product of (i) polycyclic polymers having at least two non-aromatic, non-conjugated hydrosilation reactive carbon-carbon double bonds in their rings and (ii) cyclic polysiloxanes or tetrahedral siloxysilanes having at least two hydrosilation reactive ≡SiH groups wherein at least one of (i)

or (ii) has three or more hydrosilation reactive groups, and (b) a hydrocarbon elastomer having at least two hydrosilation reactable carbon-carbon double bonds.

17. A prepolymer composition as claimed in claim 16 which contains 0.5 to 20 weight % of the elastomer.

18. A prepolymer composition as claimed in claim 16 which contains 5 to 10 weight % of the elastomer.

19. A prepolymer composition as claimed in claim 16 wherein the hydrocarbon elastomer contains no more than 50 mole % hydrosilation reactable carbon-carbon double bonds.

20. A prepolymer composition as claimed in claim 16 wherein the elastomer contains no more than 15 mole % hydrosilation reactable carbon-carbon double bonds.

* * * * *